UNITED STATES PATENT OFFICE.

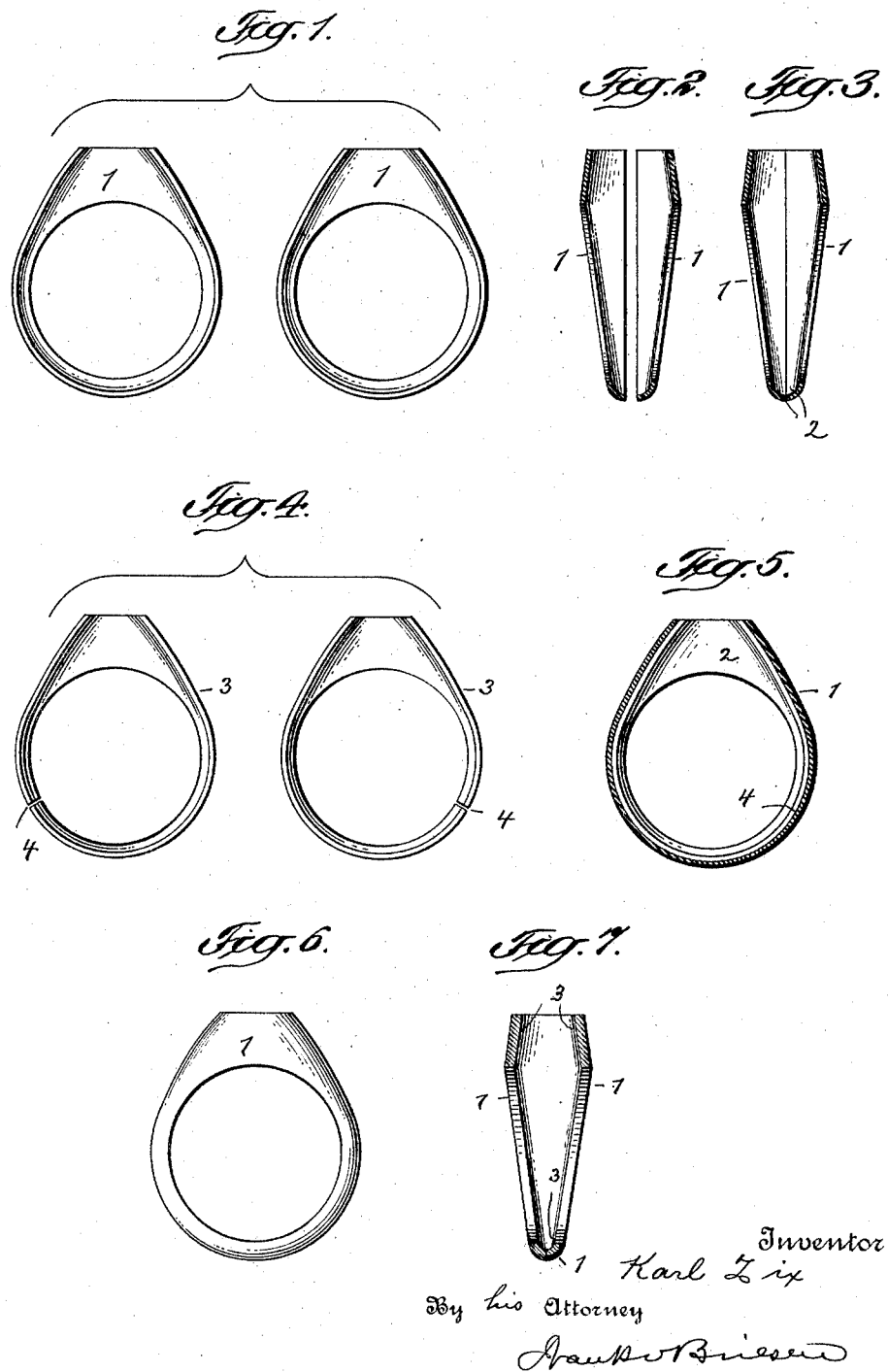

KARL ZIX, OF BATHBEACH, NEW YORK.

METHOD OF MAKING FINGER-RINGS.

1,303,530.    Specification of Letters Patent.    Patented May 13, 1919.

Application filed February 2, 1917, Serial No. 146,210. Renewed March 21, 1919. Serial No. 284,178.

*To all whom it may concern:*

Be it known that I, KARL ZIX, a citizen of the United States, and a resident of Bathbeach, in the county of Kings and State of New York, have invented certain new and useful Improvements in Methods of Making Finger-Rings, of which the following is a specification.

This invention relates to a novel method of making finger rings formed of an outer platinum shell and of a gold lining, the appearance of the ring when worn, being that of solid platinum. By my method the gold lining is so fitted into the platinum body of the ring, that a perfect union of the parts will be obtained, and seams or other objectionable marks will not be formed.

In the accompanying drawing:

Figure 1 represents a face view of the two halves of the platinum shell;

Fig. 2, is a cross section through the shells before being united;

Fig. 3 a similar cross section after their union;

Fig. 4, a face view of the two halves of the gold lining;

Fig. 5, a longitudinal section through the ring complete;

Fig. 6, a side view thereof, and

Fig. 7, a cross section.

The platinum body or shell of the ring is composed of two sections 1, of suitable configuration, each section corresponding to one moiety of a ring obtained by splitting the same centrally at right angles to its axis. Each section 1 is of dished form so that when the sections are connected, edgewise, a continuous annular groove 2 will be formed within the same. Into this groove are adapted to be fitted, the two sections 3 of a gold or gold alloy lining, said lining being of yellow, white or other color. The contour of each lining section corresponds to the contour of each shell section, but the lining section is so much smaller than the shell section, that the lining sections when placed into edgewise contact, will be accommodated within groove 2, so as to fill out the same, and form together with the shell, a ring entity.

A difficulty in constructing the compound ring described, arises from the fact that when platinum is soldered or welded, the heat required is so high that it will melt gold. Hence, were the gold lining fitted into the platinum shell prior to the welding or soldering operation, a yellow or other seam would be liable to appear at the center of the ring which would of course, be highly objectionable. In order to overcome this difficulty, the method of constructing the ring is such that no gold whatever, is present during the welding or soldering of the platinum halves, so that gold cannot run into the seam, and an invisible perfect joint will therefore be formed.

In carrying out the method, the two platinum halves 1 of the shell are stamped up in suitable manner, and are then joined along their inner or contiguous edges by welding or by platinum solder having a comparatively high melting point.

The two halves of the lining 3 are likewise stamped up, and each half is then made contractile so that the linear length of its circumference may be temporarily reduced to a slight extent. This contraction may either be obtained by dividing the lining half into two or more sections, or by slitting it transversely as at 4, so that one of the edges thus produced may be lapped slightly over the other edge.

The two lining halves prepared as described, are sprung from opposite sides into the completed shell, the lining halves resuming their normal form as soon as they have become seated within groove 2. Halves 3 are now joined edgewise to each other and also to the platinum shell by means of gold solder which has of course, such a low melting point, that it will not in any way injuriously affect the platinum.

If desired, stones or other ornaments may now be mounted in the ring which completes the operation.

The drawing shows a ring of the class commonly known as a gypsy ring but it is evident, that the invention may be applied to rings generally and without regard to any particular style or form thereof.

I claim:

1. Method of making a finger ring, which consists in forming two platinum sections, joining said sections edgewise to each other, to form a platinum shell, forming two contractile lining sections, springing said lining sections into the shell, and soldering the lining sections to each other and also to said shell.

2. Method of making a finger ring, which consists in forming two dished platinum sections, joining said sections edgewise to each other to form a grooved platinum shell, forming two lining sections, dividing each of said sections crosswise whereby the same is made contractile, springing the contractile lining sections into the shell, and joining the lining sections to each other and also to said shell.

3. Method of making a finger ring, which consists in forming two dished platinum sections, joining said sections edgewise to each other under comparatively high heat to form a grooved platinum shell, forming two gold lining sections, dividing each of said sections crosswise whereby the same is made contractile, springing the contractile lining sections into the shell, and joining the lining sections to each other and also to said shell under relatively low heat.

KARL ZIX.

Copies of this patent may be obtained for five cents each, by addressing the "Commissioner of Patents, Washington, D. C."